W. S. ADAMS.
BRAKE.
APPLICATION FILED OCT. 2, 1908.
926,920.
Patented July 6, 1909.
2 SHEETS—SHEET 1.
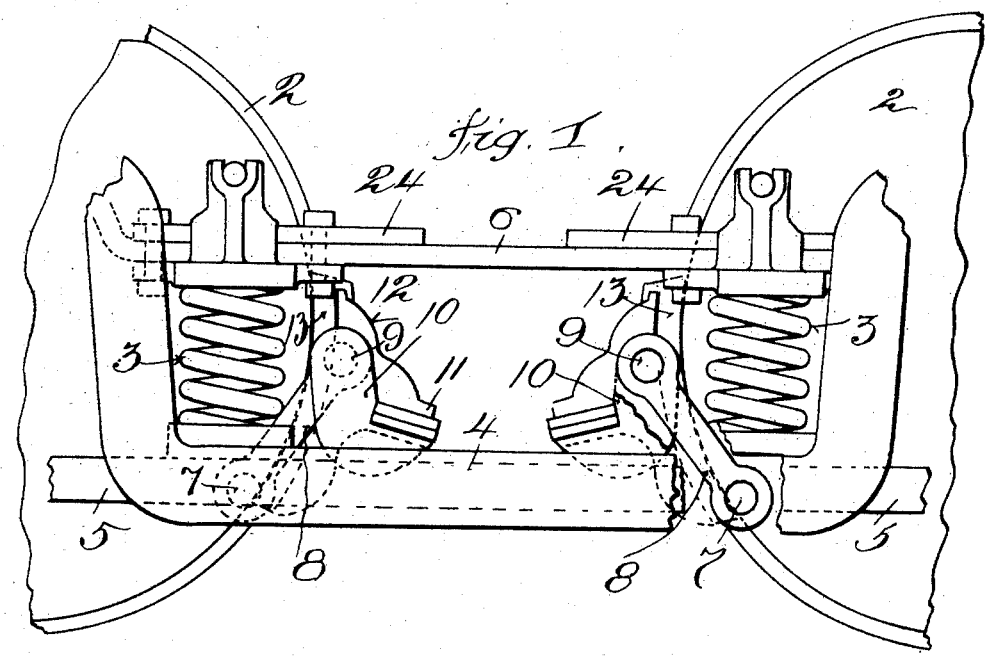
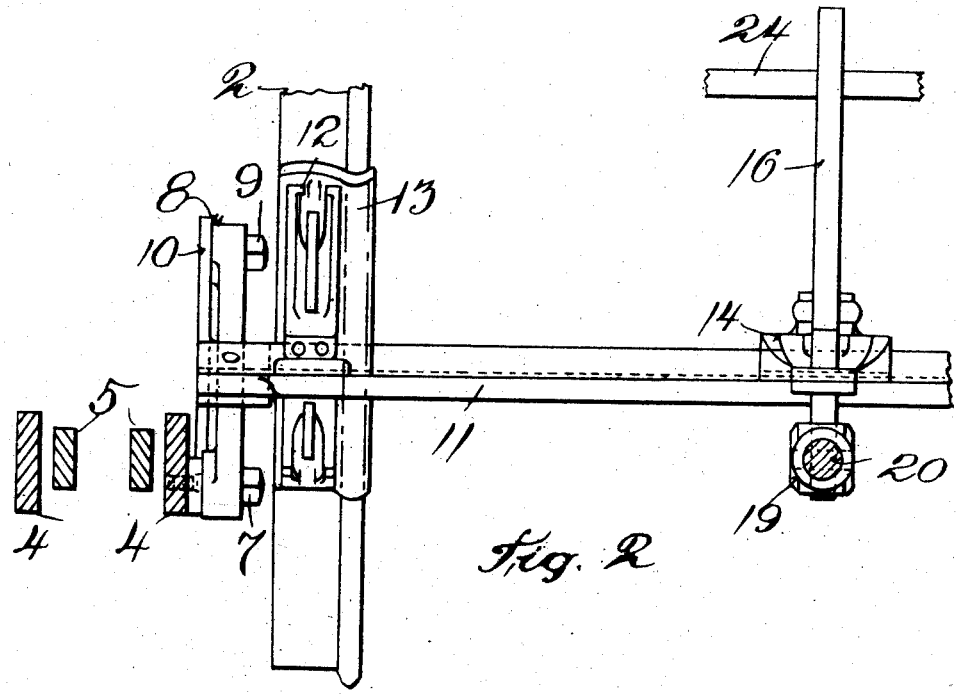
Witnesses:
Inventor
Walter S. Adams
By his Attorney

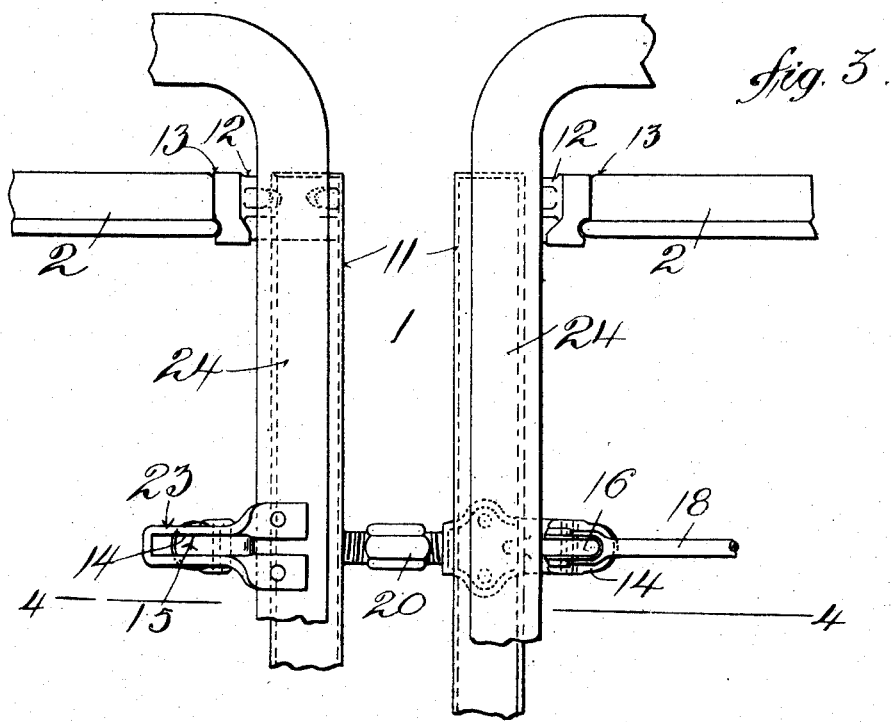
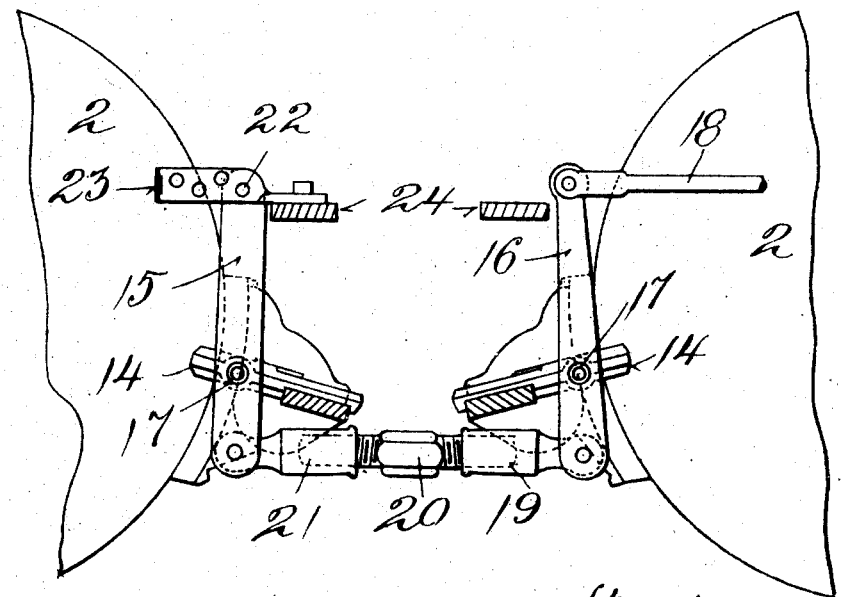

# UNITED STATES PATENT OFFICE.

WALTER S. ADAMS, OF PHILADELPHIA, PENNSYLVANIA, ASSIGNOR TO THE J. G. BRILL CO., OF PHILADELPHIA, PENNSYLVANIA.

BRAKE.

No. 926,920.     Specification of Letters Patent.     Patented July 6, 1909.

Application filed October 2, 1908. Serial No. 455,875.

*To all whom it may concern:*

Be it known that I, WALTER S. ADAMS, a citizen of the United States, and a resident of the city and county of Philadelphia, State of Pennsylvania, have invented a new and useful Improvement in Brakes, of which the following is a specification.

The object of my invention is to provide a self-releasing brake which will act without the aid of any springs to withdraw the brake shoes from the wheels. This object is accomplished by my invention, one embodiment of which is described below.

For a more particular description of my invention, reference is to be had to the accompanying drawings forming a part hereof, in which:

Figure 1 is a side elevation of a portion of the truck provided with my improved brake. Fig. 2 is a view, partially in section, taken at right angles to the structure shown in Fig. 1. Fig. 3 is a plan view of a portion of a truck provided with my improved brake. Fig. 4 is a sectional view taken on the line 4—4 of Fig. 3, looking in the direction of the arrows.

Throughout the various views of the drawings, similar reference characters designate similar parts.

In the embodiment of my invention herein shown, the truck 1 is provided with the wheels 2, equalizing springs 3, equalizing bars 4, tie-bars 5, top chord 6, and other parts which are unnecessary to mention here. The equalizing bars nearer the wheels are provided with pivots 7 on which are mounted the upwardly and convergently disposed links 8 which are provided with pivots 9 at their upper ends which pivots extend from ears 10 fixed at each end of the brake beams 11. The brake beams 11 also carry brake shoe holders 12, in the conventional manner, which carry the brake shoes 13. The brake beams 11 are each provided with suitable brackets 14 to which levers 15 and 16 are connected in the conventional manner, as by pivots 17. The lever 16 is pivoted at its upper end to a horizontal rod 18 which is connected to a brake chain, and the lower end of this lever 16 is pivoted to a nut 19 in which is a bolt 20 which is also connected to a nut 21 on the lower end of the lever 15. The nuts 19 and 21 have threads of opposite pitch, that is, one has right threads and the other left threads and the bolt 20 is made to correspond so that by turning the same, the nuts 19 and 21 may either be separated or brought together, as desired, whereby the brake mechanism may be from time to time compensated for wear.

The upper end of the lever 15 is supported by a pivot 22 with a bracket 23 which is fixed to a transom 24 of the truck. The bracket 23 is provided with a number of holes and the pivot 22 may be placed in any of these, as desired.

From the foregoing the operation of my improvement will be readily understood. After the brake shoes are applied to the wheels, the brake is released and then the weight of the beam and the parts fixed thereto is sufficient to force the brake shoes to leave the wheels under the action of gravity.

While I have shown and described one embodiment of my invention, it is obvious that it is not restricted thereto, but is broad enough to cover all structures that come within the scope of the annexed claims.

What I claim is:

1. In a device of the class described, upwardly and convergently disposed links mounted directly on equalizing bars and means for supporting the same, brake beams and means connecting said brake beams with said links so that the brakes will release by gravity.

2. In a device of the class described, equalizing bars, upwardly and convergently disposed links pivotally connected directly to said equalizing bars, brake beams, and means connecting said beams with said links.

3. In a device of the class described, equalizing bars, links pivotally connected at their lower ends directly on said equalizing bars and upwardly and convergently disposed, and brake beams to which the upper ends of said links are directly connected.

4. In a device of the class described, equalizing bars, links pivotally connected at their lower ends directly on said equalizing bars and upwardly and convergently disposed, and brake beams to which the upper ends of said links are directly connected, said brake beams provided with brackets, levers pivotally connected to said brackets and adjustable connections between the lower ends of said levers.

5. In a device of the class described, equalizing bars, links pivotally connected at their lower ends directly on said equalizing bars and upwardly and convergently disposed, and brake beams to which the upper ends of said links are directly connected, said brake beams provided with brackets, levers pivotally connected to said brackets, adjustable connections between the lower ends of said levers, a connection from the upper end of one of said levers to a brake chain and an adjustable pivot for the upper end of the other lever.

Signed at the city and county of Philadelphia, State of Pennsylvania, this 30th day of September, 1908.

WALTER S. ADAMS.

Witnesses:
HENRY C. ESLING,
HARRY F. MCKILLIP.